(12) United States Patent
Krasikov et al.

(10) Patent No.: US 7,882,500 B2
(45) Date of Patent: Feb. 1, 2011

(54) METHOD AND A SYSTEM FOR COMPOSING AN OPTIMALLY-GRAINED SET OF SERVICE FUNCTIONS

(75) Inventors: Sophia Krasikov, Katonah, NY (US); John F. Morar, Mahopac, NY (US); Senthilnathan Velayudham, Thornwood, NY (US); Emmanuel Yashchin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1066 days.

(21) Appl. No.: 11/619,000

(22) Filed: Jan. 2, 2007

(65) Prior Publication Data

US 2008/0163213 A1 Jul. 3, 2008

(51) Int. Cl.
*G06F 9/44* (2006.01)
*G05B 19/18* (2006.01)

(52) U.S. Cl. ............ 717/154; 717/158; 717/136; 717/139; 705/7; 700/36

(58) Field of Classification Search .......... 717/154
See application file for complete search history.

(56) References Cited

U.S. PATENT DOCUMENTS

| | | | |
|---|---|---|---|
| 6,636,242 B2 * | 10/2003 | Bowman-Amuah | 715/764 |
| 7,627,493 B1 * | 12/2009 | Sarthi et al. | 705/7 |
| 2003/0058277 A1 | 3/2003 | Bowman-Amuah | |
| 2005/0091093 A1 * | 4/2005 | Bhaskaran et al. | 705/7 |
| 2005/0119905 A1 * | 6/2005 | Wong et al. | 705/1 |
| 2006/0036448 A1 | 2/2006 | Haynie et al. | |
| 2006/0129419 A1 | 6/2006 | Flaxer et al. | |
| 2007/0027701 A1 * | 2/2007 | Cohn et al. | 705/1 |
| 2008/0071595 A1 * | 3/2008 | Chang et al. | 705/7 |

OTHER PUBLICATIONS

Sims, Oliver, "Developing the Architectural Framework for SOA" Everware-CBDI Inc 1999-2007 11 pages.
International Search Report for International Application No. PCT/US07/23969. Mailed on May 14, 2008.
Written Opinion of the International Searching Authority for International Application No. PCT/US07/23969. Mailed on May 14, 2008.

(Continued)

*Primary Examiner*—Thomas K Pham
(74) *Attorney, Agent, or Firm*—Cantor Colburn LLP; Lou Percello

(57) ABSTRACT

Disclosed is a computer program product for managing granularity of a computing infrastructure, wherein the program, when executed on a computer, causes the computer to: identify at least one set of service functions suited to characterization by one or more sets of metrics; create a representation of at least one supplied functionality for the set of service functions for input to a formal process; characterize at least one rule and at least one constraint for input to the formal process; determine at least one set of metrics for evaluating the service functions; quantify benefits associated with at least one of the sets of service functions using the set of metrics; and provide one or more of the sets of service functions as output, wherein the output is based on the metrics determining the output by use of the formal process. Systems and infrastructure are also disclosed.

7 Claims, 7 Drawing Sheets

OTHER PUBLICATIONS

"Using Web Services Effectively"; http://java.sun.com/blueprints/webservices/using/webservbp.html; 2002; 1 page.

Wilkes, L. et al.; "Service-Oriented Architecture: Considerations For Agile Systems"; http://msdn.microsoft.com/library/en-us/dnmaj/html/aj2service.asp?frame=true; Apr. 2004; 14 pages.

Colan, Mark; "Service-Oriented Architecture Expands The Vision Of Web Services, Part 1"; http://www-128.ibm.com/developerworks/webservices/library/ws-soaintro.html; Apr. 21, 2004; 5 pages.

Stevens, Michael; "Multi-Grained Services"; http://www.developer.com/design/print.php/1142661; May 21, 2002; 4 pages.

* cited by examiner

METHOD AND A SYSTEM FOR COMPOSING AN OPTIMALLY-GRAINED SET OF SERVICE FUNCTIONS

BACKGROUND OF THE INVENTION

1. Field of the Invention

The present disclosure relates generally to information technology systems, and, in particular, to efficient management of service functions and services for providing responsive systems.

2. Description of the Related Art

As information technology (IT) has advanced over the past fifty years, practitioners have assembled ever more complex collections of function into comprehensive IT solutions. One example of this trend includes an integrated customer management system that includes potential customer identification, sales, product delivery, warranty services, follow-on sales and an assortment of related information. Traditionally individual systems owned by individual parts of the extended organization addressed the needs for each of these aspects separately. Unfortunately, relying on fragmented and separate IT solutions does not provide users with many advantages that should be available with a robust system.

A number of challenges to effective integration of the fragmented and diverse systems exist. For example, it is difficult to separate out those functions and capabilities that are common across the extended organization and provide related and meaningful functions for all users across an extended organization. Some terms of art are provided to lend insight into the challenges for design and implementation of a comprehensive IT solution.

"Granularity" refers to an amount of computation in relation to communication, (i.e., a ratio of computation to the amount of communication). A "finely grained" task is relatively small in terms of code size and execution time. Associated data are frequently transferred among processors in small packages, such as a single or only a few words. A "coarsely grained" task is the opposite: data are communicated infrequently, after larger amounts of computation.

As used herein, the term "granular" is with regard to processing of complex information entities called information granules. The granules arise in the process of data abstraction and derivation of knowledge from information. Generally, information granules are collections of entities that usually originate at the numeric level and are arranged together due to their similarity, functional adjacency, coherency, or the like. Accordingly, granular computing is discussed with regard to theories, methodologies, techniques, and tools that make use of information granules in the process of problem solving.

Stated another way, granular computing provides for delineation and consideration of those things that serve a specific interest as well as switching those things. By focusing on different levels of granularity, one can obtain different levels of knowledge, as well as a greater understanding of inherent knowledge structure. Solving the challenges associated with managing granular systems is essential for design and implementation of intelligent systems.

As evidenced by the high failure rate for large IT initiatives, the process of designing services that can satisfy a collection of broad and evolving requirements strains the technology for large IT systems.

One key aspect of improving the success rate for building comprehensive services that successfully satisfy the needs of a broad audience is to define the services to be of the right granularity and scope. If the services offered are too fine-grained (i.e., specific) then many service consumers end up revising functional code in order to serve the related business function. If the services are too coarse-grained, then service consumers may not be able to get the required information, or they may need to call a complex and expensive service and throw away all but a small fraction of the results. This leads to high levels of run-time inefficiency. On the other hand, if the provider offers varieties of both fine-grained and coarse-grained services, the cost of maintaining the services themselves and the complexity of understanding how to manage the services will balloon to unacceptable levels.

A review of the development of comprehensive IT services is now provided. This review considers the various ways in which system designers have attempted to handle the challenges of granular computing.

An early application-oriented approach for using services was similar to an application programming interface (API). Typically, APIs were considered to be fine-grained; each function (or method) call being a detail-oriented, technical construct used by programmers. Many early services implementations performed direct one-to-one translations of existing APIs into service methods interfaces. Not only did this approach generate large amounts of network traffic, but it also required developers to program extensive business logic into the calling system.

Later, it became a best practice for experts to recommend that service functions should be coarse grained. This relied upon a premise that services were a resource that would be deployed across the Internet via a slow and unreliable connection. Using a small number of coarse-grained messages would reduce the number of transmissions and increase the likelihood that a message would arrive and a transaction would be completed while the connection was still available.

Some architects, have recommended using varying granularities. For example, service methods for work inside an enterprise having a finer granularity than methods for external interface. Using this approach, the fine-grained functions interface offer more flexibility to the requester application. However, this also means that a service provider will need to satisfy more patterns of interaction with different service requesters and that this can make services support more difficult for the service provider.

One approach has recognized that the granularity of a service is a relative characteristic. What is fine-grained for one application is coarse grained for another. Even though a definition of service granularity is derived using several criteria (such as the scope of a service, and the ability of a service to be useful in higher level services) no formal methodology or definition is provided for deciding on service granularity.

Another approach concludes that there is no rule that external services should all be coarse grained while internal services should all be fine-grained, but that each service should be "right grained" for its specific task, without consideration for the speed of connection. This approach considers that there is no rule that services should all be coarse grained, or fine-grained. The ideal is that they should be right grained for the specific usage scenario. While this is a clear statement of the problem—little is offered to provide guidance as to the right solution.

The forgoing discussion shows that there is an ongoing problem of choosing an appropriate service granularity. Stated more succinctly, service-owners/architects (or even an automated service design process) do not have a robust technique for taking a defined range of capabilities and offering the capabilities as a collection of services.

Currently, when services are designed, twenty to forty percent of the development lifecycle is dedicated to design service functions and services. This is because designing services is an iterative process during which the architects and designers model the service functions and services, discuss them with end users and developers, receive feedback, refine the service functions and finally assemble them into services.

While users want highly customized services, management wants to minimize the number of service functions developed in order to reduce project costs. The optimal solution is likely to be somewhere in between, where the solution provides enough service functions to satisfy customers on one hand, and keeps the development costs within budget on the other. The automation of creating an optimal set of service functions will significantly reduce the cost of system development.

In a system that has already gone into operation, automation may include the creation of new service functions, when needed, while preserving or pruning existing functions.

Reducing discussion time between customers, architects and developers during the services development process, as automation does, will lead to savings that can be passed down to users in order to attract price-sensitive customers. At the same time, preserving existing service functions will provide for retention of existing customers.

What are needed are techniques for managing IT services having a diverse granularity, wherein the techniques provide for a range of capabilities and offering of the capabilities as a collection of services.

SUMMARY OF THE INVENTION

Embodiments of the invention include a computer program product for managing granularity of a computing infrastructure, wherein the program, when executed on a computer, causes the computer to: identify at least one set of service functions suited to characterization by one or more sets of metrics; create a representation of at least one supplied functionality for the set of service functions for input to a formal process; characterize at least one rule and at least one constraint for input to the formal process; determine at least one set of metrics for evaluating the service functions; quantify benefits associated with at least one of the sets of service functions using the set of metrics; and provide one or more of the sets of service functions as output, wherein the output is based on the metrics determining the output by use of the formal process.

The teachings provide the foregoing and other embodiments having advantageous technical effects, which include embodiments where: the formal process uses a representation of the functionality, rules and constraints as input; the rules and constraints include at least one of branching expressions, boolean expressions and groupings of data elements; the at least one set of service functions include at least one of logic, data and combinations of logic and data; the constraints specify at least one of complexity and cost for one of the service functions; the constraints comprises a tolerance coefficient for output data of at least one of the service functions; the set of service functions include service functions having diverse granularity; the set of service functions have at least one of a business function and an output data object; the at least one set of metrics is responsive to a service requester; wherein a response to the service requestor is constructed using at least one of connectivity rules, a data access matrix and a tolerance coefficient; encryption for at least one of the input and the output is included; and, at least one of the steps of identifying, creating, characterizing, determining, quantifying and providing may be repeated as at least one of requirements are modified and additional data elements are created.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Disclosed are optimization techniques for defining individual capabilities for a set of services. The set of services covers a predetermined range of capabilities. The techniques can be applied to situations in which a service provider is starting from scratch (referred to as a "green field design") or extended to an existing collection of services (and thus cover a broader or narrower range of capabilities). In some embodiments, the techniques may be applied in support of "right-grained" service functions that are an equivalent for all customers (i.e., not customized for any of them).

The teachings herein provide for optimizing a tradeoff between "coarse grained" and "fine-grained" computing services. The techniques disclosed make use of mathematical processes for optimizing aggregate utility of the computing services. The optimization is performed for service consumers for a given investment by the service provider. As disclosed herein, the techniques are illustrated for providing data access services. However, the embodiments provided are merely illustrative and are not limiting. For example, the teachings may be applied to any collection of requirements that can be quantified in a similar manner by one skilled in the art.

Figure 1:
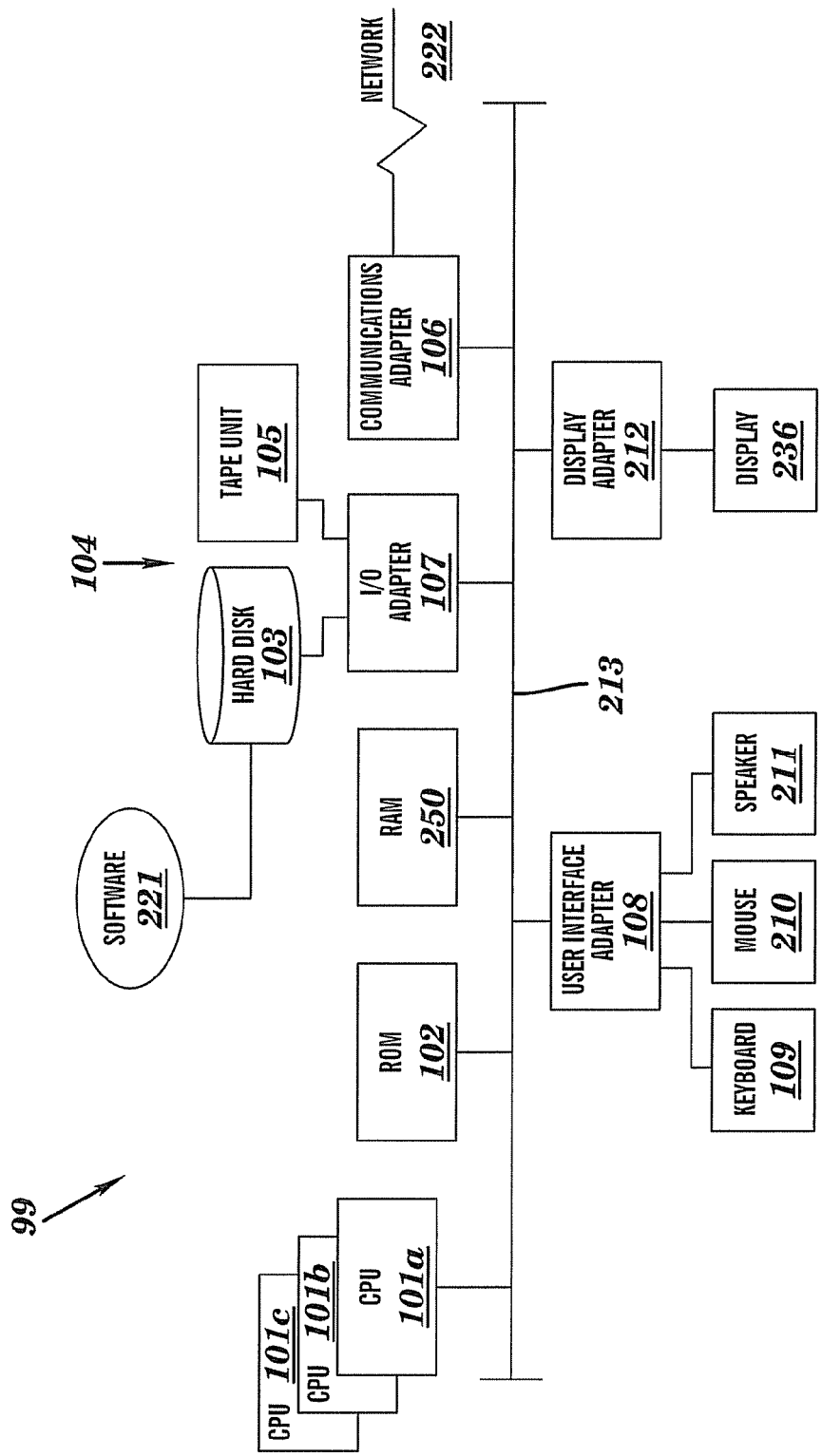
FIG. 1 illustrates aspects of a computing infrastructure for implementing the teachings herein.

Referring now to FIG. 1, an embodiment of a computer processing system 99 for implementing the teachings herein is depicted. System 99 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 250 and various other components via a system bus 213. Read only memory (ROM) 102 is coupled to the system bus 213 and may include a basic input/output system (BIOS), which controls certain basic functions of system 99.

FIG. 1 further depicts an I/O adapter 107 and a network adapter 106 coupled to the system bus 213. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. The network adapter 106 interconnects bus 113 with a network 222 enabling data processing system 99 to communicate with other such systems. The network 222 can be a local-area network (LAN), a metro-area network (MAN), or wide-area network (WAN), such as the Internet or World Wide Web. Display monitor 236 is connected to system bus 213 by display adaptor 212, which may include a graphics adapter to improve the performance of graphics intensive applications and a video controller. In one embodiment, adapters 107, 106, and 212 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 213 via user interface adapter 108 and display adapter 212. A keyboard 109, mouse 210, and speaker 211 all interconnected to bus 213 via user interface adapter 108, which may include, for example, a Super I/O chip integrating multiple device adapters into a single integrated circuit.

As disclosed herein, the system 99 includes machine readable instructions stored on machine readable media (for example, the hard disk 103) for managing resources having a plurality of functions and resources of varying granularity. As disclosed herein, the instructions are referred to as "service granularity software 221." Typically, the service granularity software 221, also referred to simply as "software 221" includes instructions as needed for supporting certain aspects of the system 99, and operation in accordance with the teachings herein.

The software 221 may be produced using software development tools as are known in the art. The software 221 may be provided as an "add-in" to an application (where "add-in" is taken to mean supplemental program code as is known in the art). In such embodiments, the software 221 replaces or supplements structures of another application for managing granularity.

Thus, as configured FIG. 1, the system 99 includes processing means in the form of processors 101, storage means including system memory 250 and mass storage 104, input means such as keyboard 109 and mouse 210, and output means including speaker 211 and display 236. In one embodiment a portion of system memory 250 and mass storage 104 collectively store an operating system such as the AIX® operating system from IBM Corporation to coordinate the functions of the various components shown in FIG. 1.

Examples of other operating systems supported by the system 99 include versions of Windows, Macintosh, Java Virtual Machine, LINUX, and UNIX, or other suitable operating systems.

Users of the system 99 can connect to the network 222 through any suitable connection, such as standard telephone lines, digital subscriber line, LAN or WAN links (e.g., T1, T3), broadband connections (Frame Relay, ATM), and wireless connections (e.g., 802.11(a), 802.11(b), 802.11(g)).

Figure 2:
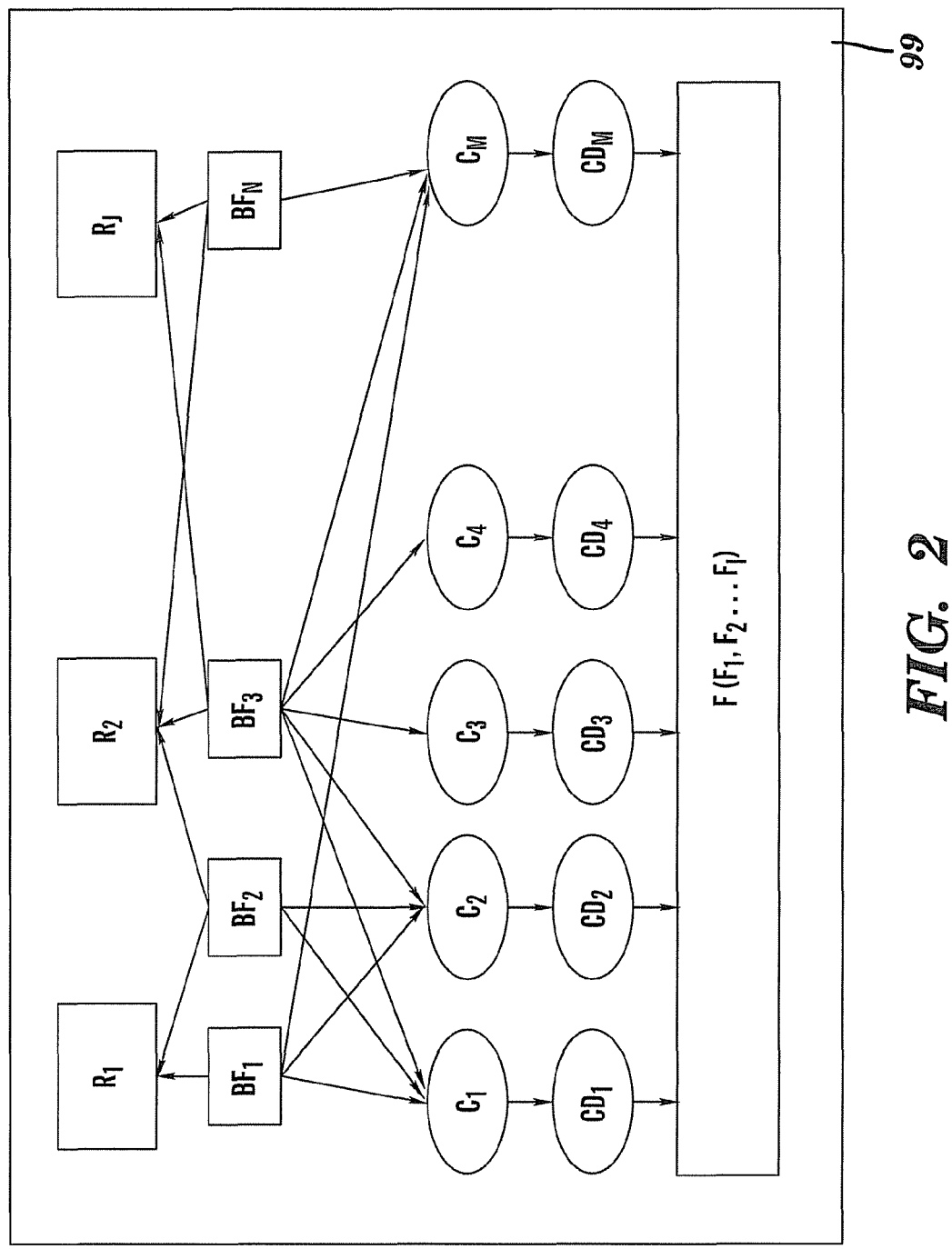
FIG. 2 depicts aspects of an input for creating an input vector.
Figure 3:
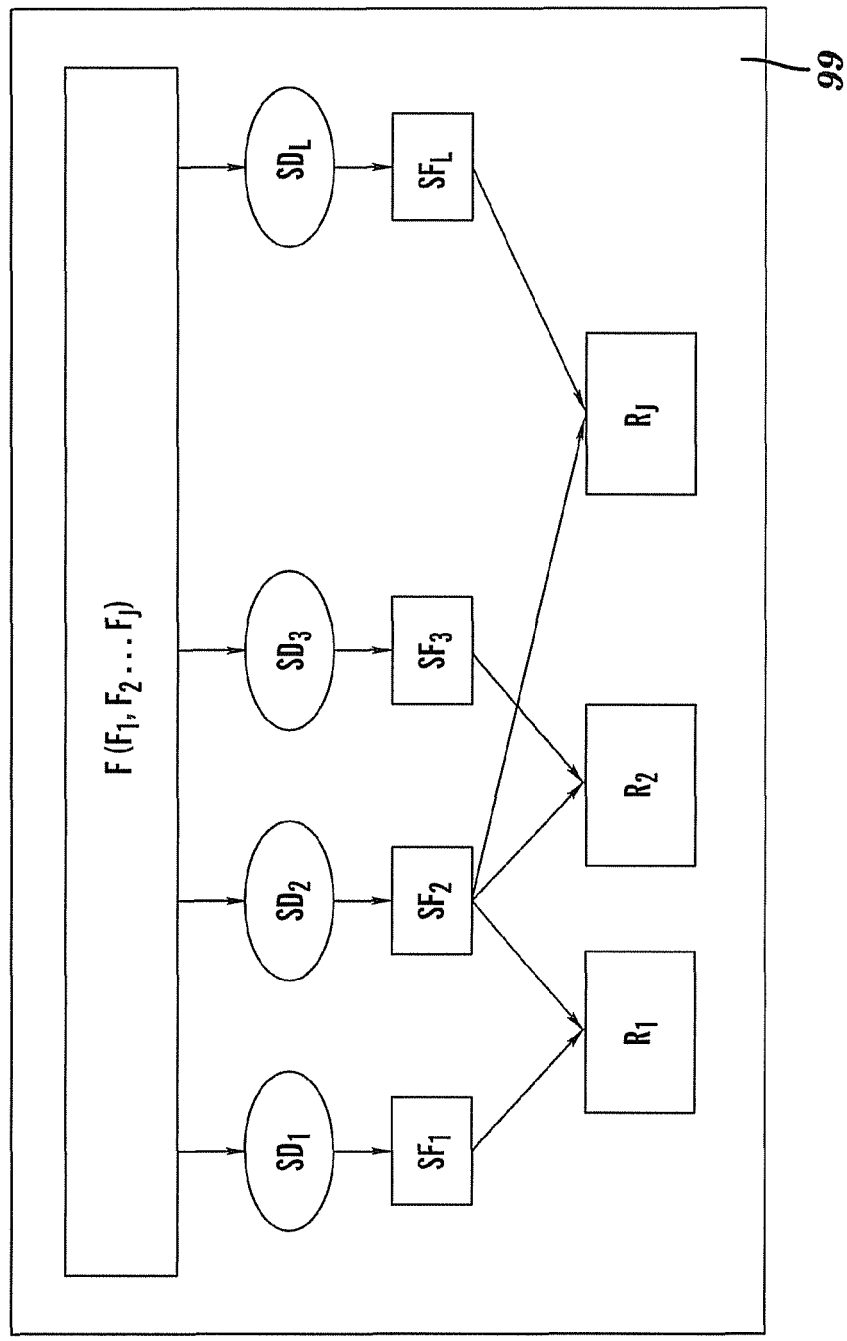
FIG. 3 depicts aspects of output data objects in relation to service requesters.

Referring now to FIG. 2, aspects of the system 99 having diverse granularity are shown. The system provides a depiction and a context for describing aspects of the terminology used herein. In FIG. 2, a plurality of service requestors are denoted as R $\{R_1, R_2, \ldots R_J\}$, and a complete set of business level building blocks realizing a set of business functions BF$\{BF_1, BF_2 \ldots BF_N\}$ as C$\{C_1, C_2 \ldots C_M\}$ (where M>=N). A set of output data objects associated with the building blocks BF is denoted as CD$\{CD_1, CD_2 \ldots CD_M\}$. The union of the output data objects CD is an input vector F$\{F_1, F_2, \ldots F_J\}$ for finding an optimal set of output data objects SD$\{SD_1, SD_2 \ldots SD_L\}$ associated with the service functions SF$\{SF_1, SF_2 \ldots SF_L\}$ (where L<=M). Reference may be had to FIG. 3.

If $F_i$ is a field of the input vector F, then a set of connectivity rules $A(R_i)$ among fields for a particular requestor $R_i$ can be conveyed with "if-then" rules such as:

If $F_2$ then $F_1$
If ($F_2$ & $F_3$) then $F_1$.

Alternatively, Boolean Expression=True rule statements such as:
$\{F_7, F_8\}$, may be used as well as grouping rules such as:
$(F_1 \& F_2 \& F_3)|(\text{not } F_1 \& \text{not } F_2 \& \text{not } F_3)$
("&" is the Boolean AND operation and "|" is the Boolean OR operation).

The statement $\{F_7, F_8\}$ indicates that fields $F_7$ and $F_8$ are a part of any output from a function. The statement ($F_1$ & $F_2$&$F_3$) indicates that $F_1$, $F_2$ and $F_3$ should always appear together in a function response as a "group." A simplified notation for this Boolean expression is provided as "group $(F_1, F_2, F_3)$." The connectivity rules for a requestor—business function to be used as an input into the system may be defined as:

Requestor1: invoice: group $(F_1, F_2, F_3)$

If a requestor $R_i$ needs $F_j$ data field, then the data access matrix field $P(R_i, F_j)$ is set to 1, otherwise it is set to 0.

In addition to connectivity rules and data access matrix, there exists a requesters' tolerance to excessive data in service response, which is introduced as a tolerance coefficient tk (0<=tk<=1). The tolerance coefficient tk could be obtained based on the requesters' survey. For instance, if requesters would tolerate 20% of unused data in a service response, the tolerance coefficient tk is 0.2. In one embodiment, the tolerance coefficient tk is chosen as one of two numbers: 20% of unused data or 10 extra fields.

A response to a requester $R_i$ is a subset of data objects SD, constructed based on connectivity rules, data access matrix, and tolerance coefficient.

Given the above, a problem of finding an optimal set of service functions SF becomes a problem of finding an optimal number of service data objects SD for given data vector F $\{F_1, F_2 \ldots F_J\}$, data connectivity rules $A(R_i)$ and the tolerance coefficient tk.

In an exemplary embodiment, a solution to the problem above is provided. First, the smallest number of service functions that covers each requestor with respect to all business functions, $n_1$ is computed. Consider the case where the number of requestors is 3, and the number of business functions is 5. If a business function is realized by a separate single service function for each requester, then $n_1$ is equal to: 3×5=15.

Then the smallest total number of non-customized service function data objects for all requesters $n_2$ is computed. The smallest total number given to $n_2$ is 5 since the same business functions are implemented for all requesters.

Finally, an optimal number L is determined as somewhere between $n_1$ and $n_2$. The determination can be done by increasing the total number of service data objects from the minimum $n_2$ up, resulting in a progressively bigger number of service data objects per requester. This continues until some reasonable point beyond which no further improvements can be expected.

In other words, the number of the service data objects per business function could be used here as a criterion for optimization. The optimization is performed under a number of constraints (e.g. related to cost/complexity of individual service functions and satisfaction of rules). Furthermore, constraints could demand that certain service functions be selected a-priori to be a part of the system.

Figure 4:
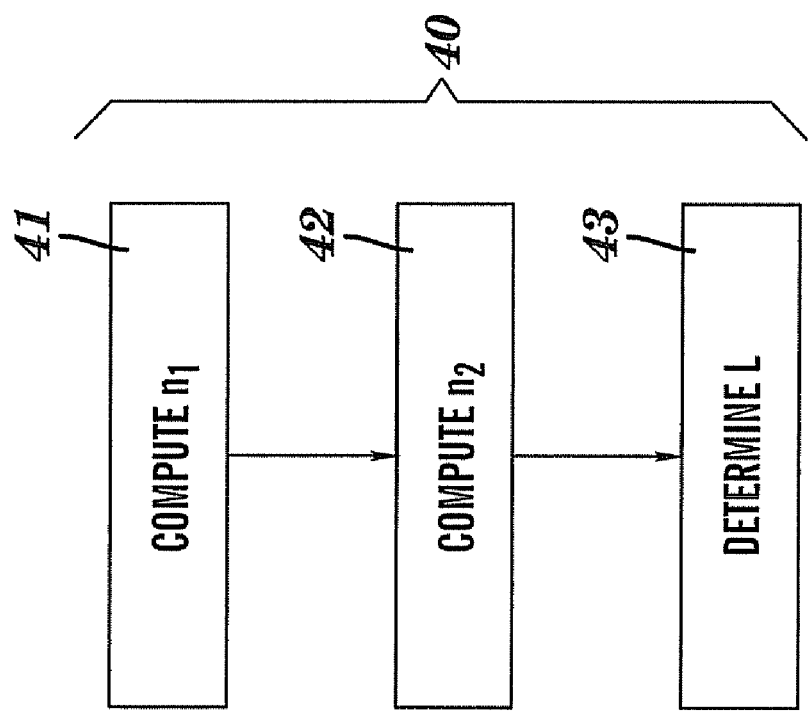
FIG. 4 provides a flow chart for determining an optimal number of service functions.

This process is depicted in FIG. 4. Referring to FIG. 4, an embodiment for selecting an optimal set of service functions SF 40 is provided. Selecting the optimal set of service functions SF 40, in this example, first calls computing the smallest number of service functions that covers each requester with respect to all business functions, $n_1$, 41. This is followed by determining the smallest total number of non-customized service function data objects for all requesters, $n_2$, 42. Finally, determination of the optimal number L between $n_1$ and $n_2$ is completed.

Figure 5:
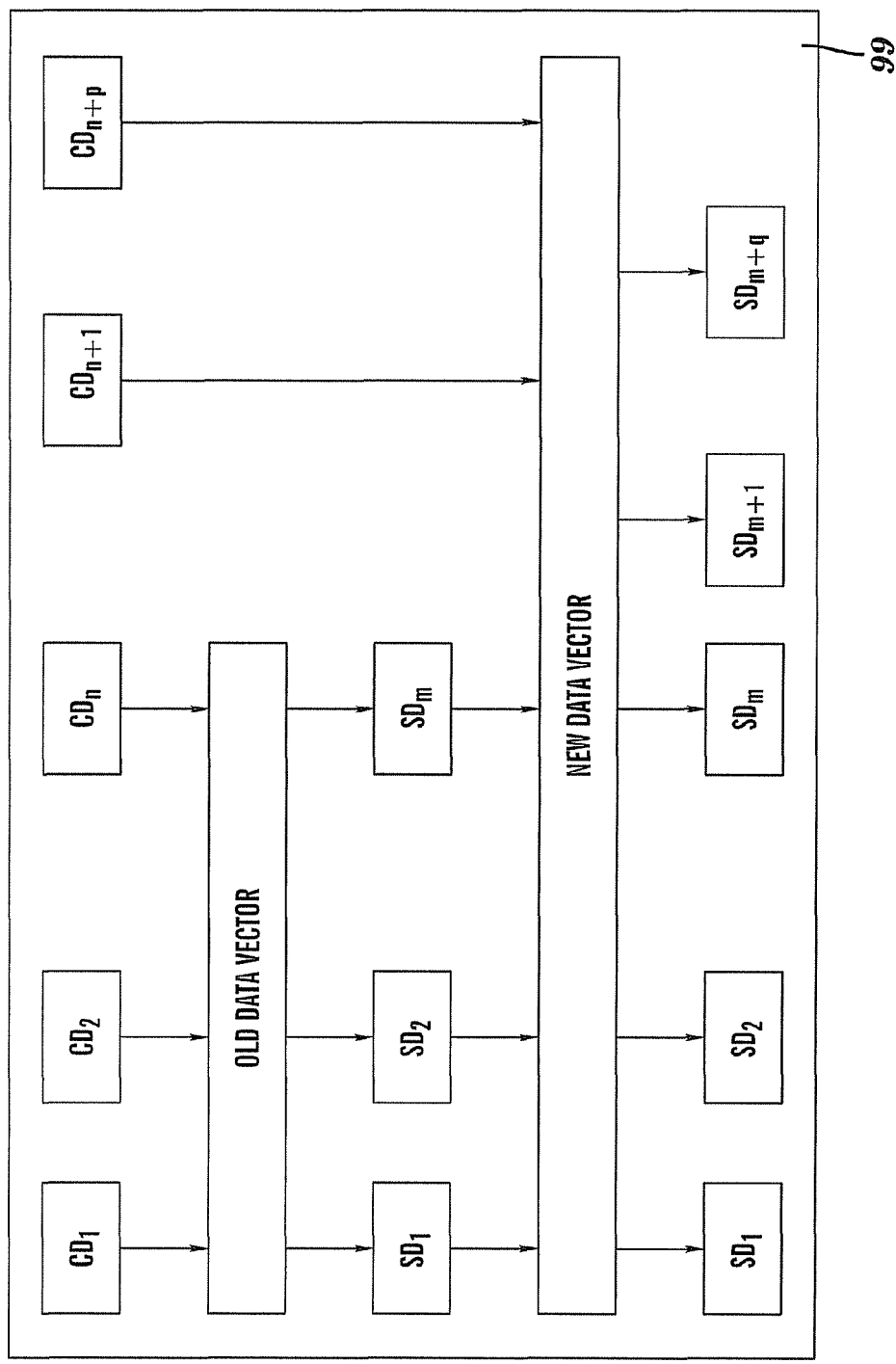
FIG. 5 depicts aspects of applying the teachings herein to an existing system.

In case of applying the teachings to an evolving system, additional rules are introduced to preserve existing service functions. Consider the example provided in FIG. 5. FIG. 5 illustrates how applying the teachings to an existing system 99, would give additional service data blocks $SD_{m+1} \ldots SD_{m+q}$, while retaining existing service data blocks $SD_1$, $SD_2$, $SD_m$.

An example of the teachings herein is now provided. The example provides a context for introduction of software building blocks SB $\{SB_1, SB_2 \ldots SB_K\}$, which provide for a set of service functions SF.

Consider building blocks of the Food Distribution Management System. This is merely one example of a distribution system. The distribution system includes a list of business functions $\{BF_1, BF_2, BF_3, BF_4, BF_5, BF_6, BF_7\}$, such as $BF_1[CD_1, CD_2, CD_7]$—Sales Order for Requestor 1 (Customer Representative), $BF_2 [CD_1, CD_2]$—Sales Order for Requestor 2 (Sales Representative), $BF_3 [CD_1, CD_2, CD_6]$—Sales Order for Requestor 3 (Warehouse Manager), $BF_4 [CD_3, CD_4, CD_7]$—Invoice for Requestor 1 (Customer Representative), $BF_5 [CD_3, CD_4]$—Invoice for Requestor 2 (Sales Representative) and Requestor 4 (Truck driver), $BF_6 [CD_3, CD_4, CD_6]$—Invoice for Requestor 3 (Warehouse Manager), $BF_7 [CD_5]$—Truck Loading List for Requestor 4 (Truck driver).

An entity-relationship diagram is provided in FIG. 5. In this example, the diagram depicts relationships between the requestors $R_i$, the business functions $BF_j$, and service functions $SF_i$.

The food distribution management system has the following business building blocks: $C_1$—Sales Itemized Order, $C_2$—Sales Order History Summary, $C_3$—Itemized Invoice, $C_4$—Invoice History Summary, $C_5$—Truck Loading List, $C_6$—Pick Ticket, $C_7$—Account Receivables etc. As provided below, each of the building blocks includes a Building Block 1 ($C_1$) -
Sales Itemized Order creates the following data object:

| | | Requestors 1, 2, 3 | | non-qualified | | |
|---|---|---|---|---|---|---|
| 1) Product name | 1 | 2 | 3 | | | |
| 2) package | 1 | 2 | 3 | | | |
| 3) order quantity | | 2 | 3 | | | |
| 4) ship quantity | 1 | 2 | 3 | | | |
| 5) weight ordered | 1 | | 3 | | | |
| 6) price by weight/quantity | 1 | 2 | | | | |
| 7) unit price | 1 | 2 | 3 | | | |
| 8) discount | 1 | 2 | 3 | 1 | 2 | |
| 9) tax % | 1 | 2 | 3 | 1 | 2 | 3 |

-continued

Building Block 1 ($C_1$) -
Sales Itemized Order creates the following data object:

| | Requestors 1, 2, 3 | | non-qualified |
|---|---|---|---|
| 10) cost of goods sold | | 2 | 3 |
| 11) service charge | 1 | | |
| 12) items extended price | 1 | | |
| 13) margin % | 1 | | |

Building Block 2 ($C_2$) - Sales Order History Summary
provides requestors with summary of historical data:

| | Requestors 1, 2, 3 | | non-qualified | |
|---|---|---|---|---|
| 1) order # | 1 | | 2 | |
| 2) order date | 1 | | 2 | |
| 3) delivery date | | | 2 | |
| 4) total quantity | 1 | | | |
| 5) total weight ordered | 1 | | | |
| 6) cost of goods sold | | | 1 | 2 |
| 7) total sale $ amount | 1 | | 2 | |
| 8) profit/loss | 1 | | 2 | 1 | 2 |

Building Block 3 ($C_3$) -
Itemized Invoice generates the follows data object:

| | Requestors 1, 2, 3 | | non-qualified | |
|---|---|---|---|---|
| 1) item (product) name | 1 | 2 | | |
| 2) package | 1 | 2 | | |
| 3) order quantity | | 2 | | |
| 4) ship quantity | 1 | | | |
| 5) weight ordered | 1 | | | |
| 6) price by weight/quantity | 1 | 2 | | |
| 7) unit price | 1 | 2 | | |
| 8) discount | 1 | 2 | 1 | 2 |
| 9) tax % | 1 | 2 | 1 | 2 |
| 10) cost of goods sold | 1 | | | |
| 11) service charge | 1 | 2 | | |
| 12) items extended price | 1 | 2 | | |
| 13) margin % | 1 | | | |

Building Block 4 ($C_4$) - Invoice History Summary
generates the following data for requestors:

| | Requestors 1, 2, 3 | non-qualified |
|---|---|---|
| 1. order # | 2 | |
| 2. order date | 2 | |
| 3. delivery date | 2 | |
| 4. # of backlogs | 2 | |
| 5. total quantity | 2 | |
| 6. total weight ordered | 2 | |
| 7. total actual weight | 2 | |
| 8. total $ sale amount | 2 | |
| 9. mark up | 2 | |
| 10. profit/loss | 2 | 2 |

Building Block 5 ($C_5$) - Truck Loading List provides a requester with:

|  | Requestors 1, 2, 3 |  | non-qualified |
|---|---|---|---|
| 1. order # |  | 2 | 3 |
| 2. delivery date |  | 2 | 3 |
| 3. total quantity |  | 2 | 3 |
| 4. total ordered weight |  | 2 | 3 |
| 5. stop # | 1 | 2 | 3 |

Building Block 6 ($C_6$) - Pick Ticket provides a requester with warehouse information:

|  | Requestors 1, 2, 3 | non-qualified |
|---|---|---|
| 1) order # | 3 |  |
| 2) customer name & address | 3 |  |
| 3) order & delivery dates | 3 |  |
| 4) delivery memo | 3 |  |
| 5) routing info (truck # & stop #) |  |  |
| 6) item information: product, pack/size, zone, price unit of measure, quantity, ship quantity, order quantity estimated weight, ship weight |  |  |

Building Block 7 ($C_7$) - Account Receivables provides requestors with:

|  | Requestors 1, 2, 3 |  | non-qualified |
|---|---|---|---|
| 1) balance | 1 | 2 | 3 |
| 2) credit limit |  | 2 | 3 |
| 3) terms | 1 | 2 | 3 |
| 4) over due | 1 | 2 | 3 |
| 5) last pay | 1 | 2 | 3 |
| 6) last pay day | 1 | 2 | 3 |

Figure 6:
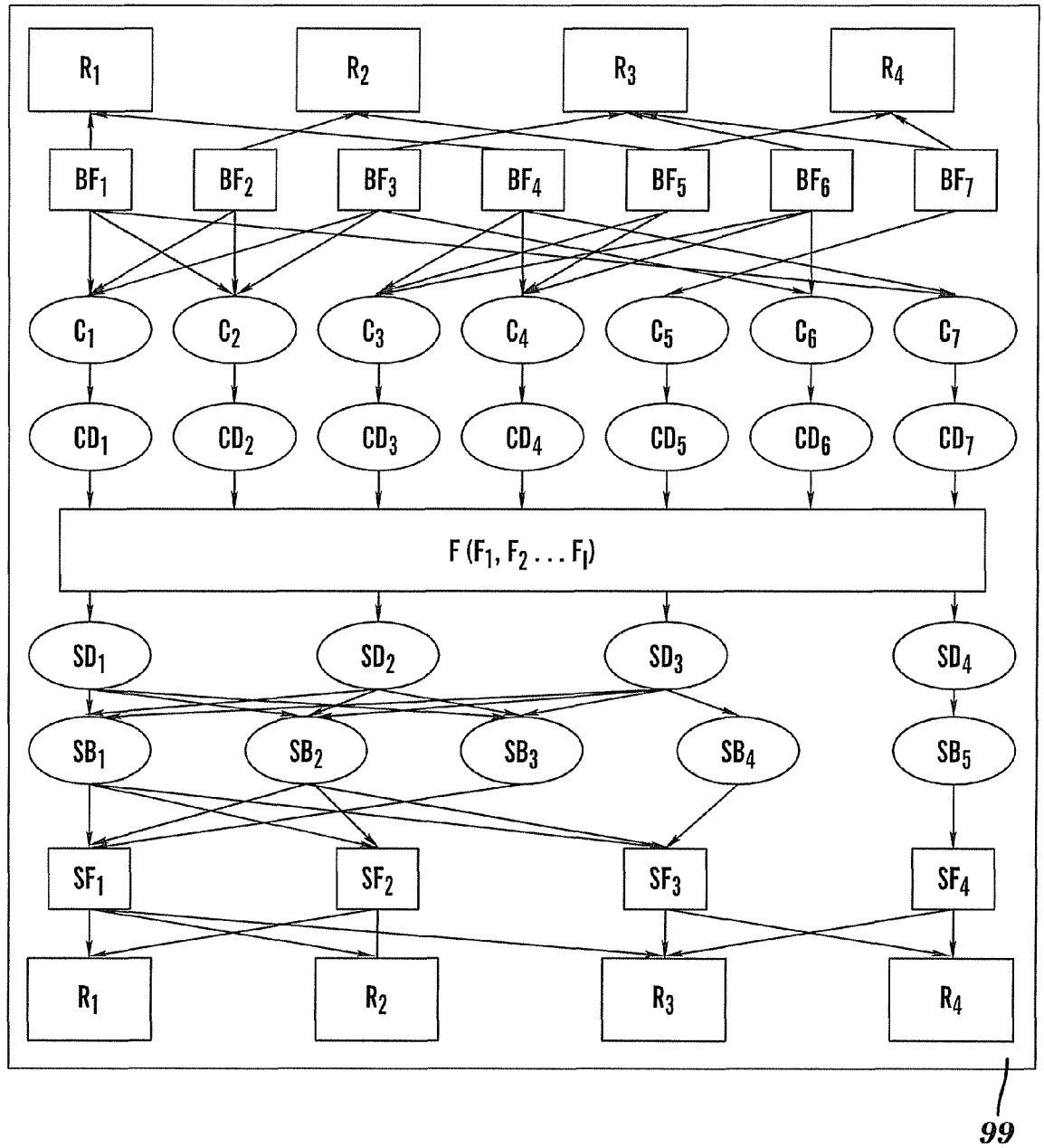
FIG. 6 depicts exemplary relationships between requesters, business functions, and service functions.

Consider application of the teachings herein for a company operation as shown in FIG. 6. First, consider data objects $CD_i$ that are used as inputs for the system. The data objects $CD_i$ are created based on interest of the requestor $R_i$ in particular data. With the requesters $R_i$ and data objects $CD_j$ inputted, a Requestor-Data matrix $A_{(n,m)}$ is generated, where n represents a number of requesters and m represents a number of fields in the data vector that is used as an input to find an optimal set of data objects $SD_i$ associated with service functions $SF_i$. Based on matrix $A_{(n,m)}$, and given the constraints below, an optimal set of service functions is composed. The optimal set can then be assembled into a service or several services. Services interface messages and operations can then be generated based on this optimal set of service functions.

More specifically, assume that the tolerance coefficient tk, for example is 25% for all three requestors and for all business functions. Accordingly, subsets of data fields are defined for each business function, $BF_x$, as follows:

Business function 1: {item (product) name, package, order quantity, ship quantity, weight ordered, price by weight/quantity, unit price, discount, tax %, cost of goods sold, service charge, items extended price, margin %}+{order #, order date, delivery date, total quantity, total weight ordered, cost of goods sold, total sale $ amount, profit/loss}+{balance, credit limit, terms, over due, last pay, last pay day}.

Business function 2: {item (product) name, package, order quantity, ship quantity, weight ordered, price by weight/quantity, unit price, discount, tax %, cost of goods sold, service charge, items extended price, margin %}+{order #, order date, delivery date, total quantity, total weight ordered, cost of goods sold, total sale $ amount, profit/loss}.

Business function 3: {item (product) name, package, order quantity, ship quantity, weight ordered, price by weight/quantity, unit price, discount, tax %, cost of goods sold, service charge, items extended price, margin %}+{order #, order date, delivery date, total quantity, total weight ordered, cost of goods sold, total sale $ amount, profit/loss}+{Order #, customer name &address, order & delivery dates, delivery memo, routing info, item information}.

Business function 4: {item (product) name, package, order quantity, ship quantity, weight ordered, price by weight/quantity, unit price, discount, tax %, cost of goods sold, service charge, items extended price, margin %}+{order #, order date, delivery date, # of backlogs, total quantity, total weight ordered, total actual weight, total $ sale amount, mark up, profit/loss}+{balance, credit limit, terms, over due, last pay, last pay day}.

Business function 5: {item (product) name, package, order quantity, ship quantity, weight ordered, price by weight/quantity, unit price, discount, tax %, cost of goods sold, service charge, items extended price, margin %}+{order #, order date, delivery date, # of backlogs, total quantity, total weight ordered, total actual weight, total $ sale amount, mark up, profit/loss}.

Business function 6: {item (product) name, package, order quantity, ship quantity, weight ordered, price by weight/quantity, unit price, discount, tax %, cost of goods sold, service charge, items extended price, margin %}+{order #, order date, delivery date, # of backlogs, total quantity, total weight ordered, total actual weight, total $ sale amount, mark up, profit/loss}+{Order #, customer name &address, order & delivery dates, delivery memo, routing info, item information}.

Business function 7: {balance, credit limit, terms, overdue, last pay, last pay day}.

In this example, each of the business function vectors ($BF_1$ through $BF_7$) is filtered for repeated fields and then a union vector F is created. In this example, the unit vector includes fields for: item (product) name, package, order quantity, ship quantity, weight ordered, price by weight/quantity, unit price, discount, tax %, cost of goods sold, service charge, items extended price, margin %, order #, order date, delivery date, total quantity, total weight ordered, cost of goods sold, total sale $ amount, profit/loss, # of backlogs, total quantity, total weight ordered, total actual weight, total $ sale amount, mark up, profit/loss, delivery date, total quantity, total ordered weight, customer name &address, order & delivery dates, delivery memo, routing info, balance, credit limit, terms, over due, last pay, last pay day.

Subsequently, a Requestor-Data matrix (Table 1) is created, with cells marked for each data field. The number of rows (n) corresponds to the total number of different requesters. The number of columns (m) is equal to the number of fields in the union of vectors F (i.e., number of fields in the complete data vector).

TABLE 1

Requestor-Data Matrix

|  | Order # | Order date | ... | Profit/Loss |
|---|---|---|---|---|
| Requestor 1 | 1 | 1 |  | 0 |
| Requestor 2 | 1 | 1 |  | 0 |

TABLE 1-continued

Requestor-Data Matrix

|  | Order # | Order date | ... | Profit/Loss |
|---|---|---|---|---|
| Requestor 3 | 1 | 0 |  | 0 |
| Requestor 4 | 1 | 1 |  | 1 |

In a third step, some cells in the Requestor-Data matrix are marked for exclusion. For example, if a requester $R_i$ is not granted permission to see the contents (based on a permission (qualification) matrix $P_{(i,j)}$). If, for example, Requestor $R_2$ is not supposed to get information about profit, a corresponding cell will be marked in the Requestor-Data matrix.

In a forth step, a set of connectivity rules is created for the fields in the service data object. They are created based on the rules set by the requestors. Global: order # (this indicates that order # will be a part of any order).

Business function 1:
    Requestor 1: group (order date, total quantity, total weight ordered, total sale $ amount, profit/loss)
    Requestor 2:
    If (total sale $ amount) then (profit/loss)
    group (order date, delivery date)
    Requestor 3:
    Group1 (order date, delivery date, total sale $ amount)
    Group2 (total weight ordered, cost of goods sold, total sale $ amount, profit/loss)
    if (total quantity) then (Group 2)
Business function 2:
    Requestor 1
    group (order date, total quantity, profit/loss, cost of goods sold, total sale $ amount)
    Requestor 2
    group (order date, delivery date, total sale $ amount)
Business function 3:
    Requestor 1:
    group (order date, total quantity, total weight ordered, total sale $ amount, profit/loss)
    Requestor 2:
    group (total sale $ amount, profit/loss) group (order date, delivery date)
Business function 4:
    Requestor 1:
    group (delivery date, total quantity, total ordered weight)
Business function 5:
    Requestor 2
    if (delivery date) then (total quantity & total ordered weight)
    Requestor 3
    if (delivery date) then (total quantity & total ordered weight}
Business function 6:
    Requestor 3
    group (customer name & address, delivery dates, delivery memo)
    group (routing info, item information)

The last step is to generate service data objects by extracting subsets of fields from the Requestor-Data matrix, under the given constraints of rules, then group them into service functions and check the cost of possible service functions ($SF_1$-$SF_4$) for the cost constraint. Finally, the service functions are associated with service building blocks ($SB_i$). In this example, the service functions $SF_i$ are:

$SF_1$—Sales order;
$SF_2$—Invoice 1;
$SF_3$—Invoice 2;
$SF_4$—Truck loading List.

Figure 7:
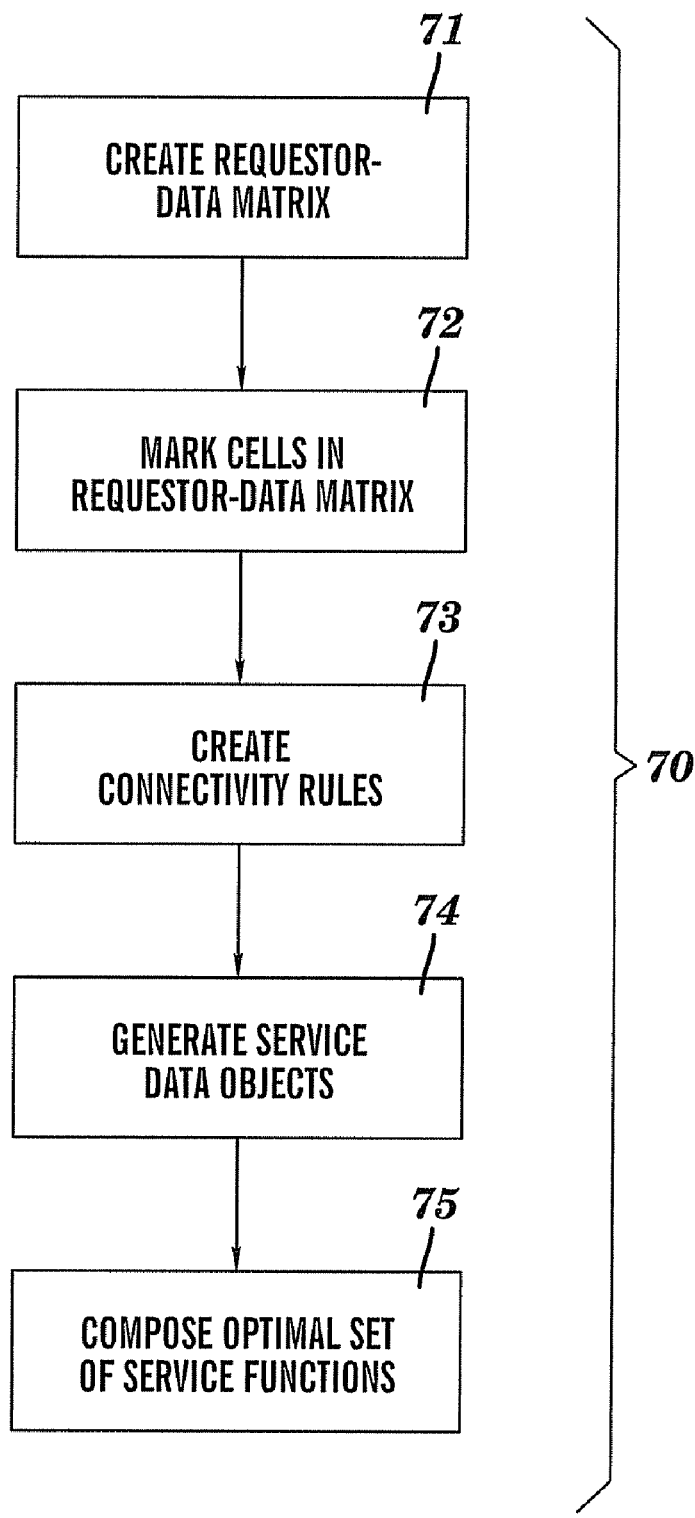
FIG. 7 depicts an embodiment of a process for employing the teachings herein.

An exemplary process for managing infrastructure granularity 70 is provided in FIG. 7. In FIG. 7, a first step 71 includes creating a Requestor—Data matrix $A_{(n,m)}$. In a second step 72, cells in the Requestor—Data matrix $A_{(n,m)}$ are marked for exclusion. In a third step 73, the set of connectivity rules is created for the fields in the service data object. A fourth step 75 of this embodiment calls for generating service data objects SD by extracting subsets of fields from the Requestor-Data matrix $A_{(n,m)}$, under the given constraints of rules, then group them into service functions and check the cost of possible service functions ($SF_1$-$SF_4$) for the cost constraint, where the service functions SF are associated with service building blocks ($SB_i$). In a last step 75, composing an optimal set of service functions is completed. An exemplary embodiment for this last step 75 includes the embodiment for selecting an optimal set of service functions SF 40, provided in FIG. 4.

One embodiment of the set of service building blocks $SB_x$ that can be created is now provided:

Service Building Block 1 ($SB_1$) -
Sales Order/Invoice Positions creates the following data object:

|  |  | Requestors 1, 2, 3 |  |  | non-qualified |  |  |
|---|---|---|---|---|---|---|---|
| 1) | Product name |  | 1 | 2 | 3 |  |  |
| 2) | package |  | 1 | 2 | 3 |  |  |
| 3) | order quantity |  |  | 2 | 3 |  |  |
| 4) | ship quantity | 1 |  |  | 3 |  |  |
| 5) | weight ordered |  | 1 |  | 3 |  |  |
| 6) | price by weight/quantity |  | 1 | 2 |  |  |  |
| 7) | unit price |  | 1 | 2 | 3 |  |  |
| 8) | discount |  | 1 | 2 | 3 | 1 | 2 |
| 9) | tax % |  |  | 1 | 2 | 3 | 1 | 2 | 3 |
| 10) | cost of goods sold |  |  | 2 | 3 |  |  |
| 11) | service charge |  | 1 |  |  |  |  |
| 12) | items extended price |  | 1 |  |  |  |  |
| 13) | margin % | 1 |  |  |  |  |  |

Service Building Block 2 ($SB_2$) -
Sales Order/Invoice History Summary generates the following data for requestors:

|  |  | Requestors 1, 2, 3 | non-qualified |
|---|---|---|---|
| 1) | order # | 2 |  |
| 2) | order date | 2 |  |
| 3) | delivery date | 2 |  |
| 4) | # of backlogs | 2 |  |
| 5) | total quantity | 2 |  |
| 6) | total weight ordered | 2 |  |
| 7) | total actual weight | 2 |  |
| 8) | total $ sale amount | 2 |  |
| 9) | mark up | 2 |  |
| 10) | profit/loss | 2 | 2 |

Service Building Block 3 ($SB_3$) -
Account Receivables provides requestors with:

|  |  | Requestors 1, 2, 3 | non-qualified |
|---|---|---|---|
| 1) | balance | 1 2 3 |  |
| 2) | credit limit | 2 3 |  |
| 3) | terms | 1 2 3 |  |
| 4) | over due | 1 2 3 |  |
| 5) | last pay | 1 2 3 |  |
| 6) | last pay day | 1 2 3 |  |

Service Building Block 4 ($SB_4$) -
Pick Ticket provides a requester with warehouse information:

|  |  | Requestors 1, 2, 3 | non-qualified |
|---|---|---|---|
| 1) | order # | 3 |  |
| 2) | customer name & address | 3 |  |
| 3) | order & delivery dates | 3 |  |

-continued

| | | |
|---|---|---|
| 4) delivery memo | 3 | |
| 5) routing info (truck # & stop #) | | |
| 6) item information: product, pack/size, zone, price unit of measure, quantity, ship quantity, order quantity estimated weight, ship weight | | |

Service Building Block 5 (SB$_5$) -
Truck Loading List provides a requester with:

| | Requestors 1, 2, 3 | | non-qualified |
|---|---|---|---|
| 1) order # | | 2 | 3 |
| 2) delivery date | | 2 | 3 |
| 3) total quantity | | 2 | 3 |
| 4) total ordered weight | | 2 | 3 |
| 5) stop # | 1 | 2 | 3 |

Note that some of the service functions (for example, SF$_1$) deliver information to requestors R$_i$ which they are not allowed to see (it is assumed that such an information remains encrypted in the delivered data).

A mathematical approach to composing an optimally-grained set of service functions is now provided. In general, deriving a set of optimally-grained service functions involves solving of an optimization problem under a number of constraints.

One skilled in the art will recognize that a large number of situations exist or may be realized where the teachings herein may be applied. An exemplary problem is now provided as an illustration of optimization as presented herein. The solution provided is merely illustrative (as well as rudimentary) and is not limiting of the teachings.

First, suppose that each of the service requesters $\{R_1, R_2, \ldots R_I\}$ is interested in a respective business function $\{BF_1, BF_2 \ldots BF_I\}$. Each business function $BF_x$ calls for gaining access to a certain subset from the complete set of fields:

$$\{F_1, F_2, \ldots, F_J\} \quad (A.1)$$

In other words, a business function $BF_i$ is associated with a single building block $C_i$ that provides data $CD_i$=Subset of $\{F_1, F_2, \ldots, F_J\}$.

A service function SF$_x$ provides a subset of fields that are generally referred to herein as an "output data object" or a "data object." Every data object satisfies two types of conditions: a "mandatory field inclusion" and a "group." For example, every data object may be required to include the "Product ID" field. In addition, every data object may be required to satisfy the conditions of type:

$$G_1 = \text{Group}\{F_1, F_2, F_3\}$$

$$G_2 = \text{Group}\{F_4, F_5\}$$

$$G_3 = \text{Group}\{F_6\}$$

$$G_4 = \text{Group}\{F_7, F_8, F_9\}, \quad (A.2)$$

where groups are pre-specified and cover all the fields of the complete set provided in (A.1). In addition, another condition may be that every field belongs to one and only one group. The set of groups is thus $G_k$ (k=1, 2, \ldots, K). The number of fields in group k is denoted by $C_k$. As noted above, if a set of fields belongs to a given group k, then these fields must appear together in any data object. In other words, the groups correspond to disjoint sets covering J fields. This may be expressed as Eq. A.3:

$$\sum_{k=1}^{K} c_k = J \quad (A.3)$$

The notation $j \in G_k$ denotes that the field j is the member of the k-th group. In what follows, it is assumed that without loss of generality that there are no mandatory inclusion conditions (one can see that such conditions lead to the same type of problem, but with a reduced number of fields). Under such an assumption, the size of the complete set of fields in the above example is J=9 and the number of groups is K=4.

A weight may be associated with every Requestor $R_i$. The weights establish priority associated with the needs of the Requestor $R_i$ and are represented in the objective function and/or constraints of the optimization problem used to obtain an optimally-grained set of service functions, as will be illustrated later. The weights are denoted by $w_i$ (where i=1, 2, \ldots, I). In some embodiments, the weights $w_i$ are assigned automatically. The automatic assignment may occur, for example, on the basis of the number of fields in the business function $BF_i$ corresponding to this requestor $R_i$.

A data object (corresponding to a given service function) is a collection of fields—but it can also be thought of as a collection of groups. Thus, constructing a service function SF (i.e., data object) amounts to specifying the groups that are its members. It may be assumed that associated with each service function SF$_m$ is a single building block SB$_m$ that consists of providing the data (SD$_m$) in the data object. Note, however, that the building blocks could have been associated with individual groups instead of individual data objects.

Now, some constraints on service functions SF$_m$ are introduced. The constraints will play a role in establishing the graining of the set of service functions. Namely, to avoid having complex data objects the total number of fields in each data object should be less or equal to b. This restriction could be related to a cost for implementation of the service function SF$_m$, for example.

In this embodiment, it is considered that the business function BF$_i$ for the i-th user is covered by a set of data objects (i.e. set of service functions) if the union of all fields in this set contains all the fields in CD$_i$. In principle, if a given requestor is interested in more than b fields, then the requestor cannot be covered by a single data object.

The basic problem is to establish a set of data objects that covers all the users in some "optimally-grained" way. Any set of data objects that covers all the users is called a "feasible set." The overall number of data objects in a given set of interest is denoted by D. These data objects are indexed by d=1, 2, \ldots, D. A given data object d, is denoted as $y_{d,k}$ the variable indicating whether this data object contains the k-th group as a member. This is a decision variable: $y_{d,k}$=1 if the k-th group is chosen to a member of the d-th data object, and 0 otherwise. The variables $y_{d,k}$ are defined for all d=1, 2, \ldots, D and k=1, 2, \ldots K. An immediate set of constraints is related to the maximal number of fields in a data object, as provided in Eq. A.4:

$$\sum_{k=1}^{K} c_k y_{d,k} \leq b, \text{ for all data objects } d = 1, 2, \ldots, D. \quad (A.4)$$

One approach to selection of the best feasible set of data objects would be to establish the feasible set having the smallest possible size D. The feasible set having the smallest possible size D is called a "minimal set". A size of the minimal set is denoted $D_{min}$ (this size corresponds to $n_2$ as introduced above). However, such a solution, though appealing to the data object designer, may not be the best from the perspective of a user. Consider, for example, a case with six requesters ($R_1, R_2, \ldots, R_6$) and four fields, when the groups correspond to individual fields, (i.e., $G_k$=Group{$F_k$}, for k=1, 2, 3, 4). Suppose that the business functions BF for these requesters can be described by the following (6×4) matrix A:

$$A = \begin{pmatrix} 1 & 0 & 1 & 0 \\ 1 & 0 & 1 & 0 \\ 1 & 0 & 1 & 0 \\ 0 & 1 & 0 & 1 \\ 0 & 1 & 0 & 1 \\ 0 & 1 & 0 & 1 \end{pmatrix}, \quad (A.5)$$

where, for example, the business function BF for a second requester $R_2$ consists of getting access to fields 1 and 3. Further, suppose that the maximal size of a data object is b=2 fields. Then one feasible solution is: $S_1$={(1,2), (3,4)} consisting of two data objects (the first consisting of columns (i.e., groups) (1, 2) and the second of columns (3, 4)). Another feasible two-service solution is: $S_2$={(1, 3), (2, 4)}. Though both sets $S_1$ and $S_2$ contain two data objects, the set $S_2$ has a distinct advantage because every user is covered by just one data object, while for $S_1$, two data objects are needed for every user. Therefore, one criterion for an optimal solution is to produce a feasible set of data objects S* for which the weighted (in accordance with weighting $w_i$) average of number of data objects needed to cover a user is minimal. This optimization criterion provides for a set of service functions SF that is larger than $D_{min}$, but is more economical.

One embodiment of a mathematical formulation for addressing this problem is provided in Eq. A.6. First, consider the set of data objects of interest, S having a size D, and that every group should be a member of at least one data object. In other words:

$$\sum_{d=1}^{D} y_{d,k} \geq 1, \text{ for all groups } k = 1, 2, \ldots, K. \quad (A.6)$$

Note that the implication of Eq. (A.6) is that any group k, even one for which no user expressed a need in the demand matrix A, should be covered in at least one data object. Furthermore, a given group k can be covered by more than one data object. The latter point is important, because it can strongly reduce the number of data objects per user. Now consider the requester $R_i$ and the number of groups k that are needed to cover this requester (denoted by k(i)) as well as the indices of the groups (denoted by $u_{i,1}, u_{i,2}, \ldots, u_{i,k(i)}$. So, for example, if covering the business function $BF_1$ of the first requester $R_1$ requires groups k=4, 5 and 7, then k(i)=3, and $u_{1,1}$=4, $u_{1,2}$=5 and $u_{1,3}$=7. In what follows, the symbol g is used to index groups k for a given requestor $R_i$. So, for the i-th requester $R_i$, the indices will be g=1, 2, ..., k(i). It may be said that the i-th requester can be covered by a set of data objects of size D(i) if a set of indices {j[1], j[2], ..., j[D(i)]} can be found for which Eq. A.7 applies:

$$\prod_{g=1}^{k(i)} \left\{ \bigvee_{m=1}^{D(i)} y_{d_{j[m]}, u_{i,g}} \right\} = 1, \quad (A.7)$$

(where ∨ is the Boolean "or" operation).

Eq. A.7 indicates that there exists a subset of data objects {$d_{j[1]}, d_{j[2]}, \ldots, d_{j[D(i)]}$} that covers all the k(i) groups pertaining to Requestor $R_i$.

The set of data objects that can be used to cover the Requestor $R_i$ (this set contains D(i) members) is denoted by S(i). However, not all of the data objects in the set S(i) are necessary for the task because some groups can be covered by multiple data objects. Therefore, the set that is necessary is identified, as provided in Eq. A.8:

$$\tilde{S}(i) \subset S(i) \text{ of minimal size } \tilde{D}(i) \leq D(i) \quad (A.8)$$

The identifying proceeds by identifying members of S(i) that can be dropped (i.e., groups k that they cover are covered by the remaining members in the set). If no data object can be dropped, then a minimal set for the i-th user is realized. However, if several candidates are found, then the one that covers the smallest number of groups in the set of groups $u_{i,1}, u_{i,2}, \ldots, u_{i,k(i)}$ is dropped (i.e., the one that can be considered as being "least relevant" is dropped). Then the list of candidates for being dropped is re-evaluated. It should be noted that the list could have been reduced by more than one after the chosen data object was dropped. Once again, selection among the remaining candidates for the one that covers the smallest number of groups in the set of groups $u_{i,1}, u_{i,2}, \ldots, u_{i,k(i)}$ is undertaken. This process is repeated until the list of candidates becomes empty, yielding the desired set $\tilde{S}(i)$ of size $\tilde{D}(i)$.

It should be noted that in principle, this problem can be solved by methods of combinatorial optimization. However, solving the problem individually for every user is too resource demanding. Hence, the heuristic algorithm provided herein is typically applied on a per-user basis. In further embodiments, one may select the set $\tilde{S}(i)$ via a forward selection process (starting by selecting the "most relevant" candidate among data objects in S(i) to be included in the set $\tilde{S}(i)$, then selecting the next relevant member, etc. This embodiment is, however, more complex. For example, consider the requester $R_i$ that requires single-member groups 1, 2, ..., 6 and suppose that the set S(i) consists of four data objects: {(1 2 3), (1 4), (2 5) and (3 6)}. Then, the selection is started by including the "most relevant" data object (1 2 3), and one would need all four data objects to cover this requester. On the other hand, if the described "backward elimination" process is used, then one may immediately establish that the data object (1 2 3) is the only one that can be dropped, and obtain a set $\tilde{S}(i)$ consisting of only 3 data objects (1 4), (2 5) and (3 6).

Now the optimization problem that finds the optimally-grained set of service functions SF (i.e., data objects) becomes:

$$\text{minimize } f(\{y_{d,k}\}) = \sum_{i=1}^{r} w_i \tilde{D}(i) \quad (A.9)$$

subject to conditions (A.4) and (A.6):

$$\sum_{k=1}^{K} c_k y_{d,k} \leq b, \text{ for all data objects } d = 1, 2, \ldots, D. \quad (A.4)$$

$$\sum_{d=1}^{D} y_{d,k} \geq 1, \text{ for all groups } k = 1, 2, \ldots, K. \quad (A.6)$$

Accordingly, this is an optimization problem over a range of 0-1, with linear constraints and a nonlinear objective function (a special case of linearly-constrained nonlinear integer optimization). Techniques for handling such problems are known in the art. In practice, one starts with a given value of D and attempts to solve the problem described by Eq. A.8. If no feasible solution is found, then the selected value of D is too small, and it is increased. Eventually, a value $D=D_{min}$ is found that is high enough that the problem of Eq. A.8 yields a feasible (and optimal) solution. This is the smallest possible number of data objects that is capable of covering all the business functions (while also covering all the groups). As noted above, $D_{min}$ corresponds to $n_2$ as described above. By further increasing D, the value of the objective function f ($\{y_{d,k}\}$) will further improve, up to a certain point. Beyond this point, further increase of D will not bring any improvements. This point is referred to as $D_{max}$. This value corresponds to $n_1$, also described above. A typical solution for D includes a result somewhere in the interval between [$D_{min}$, $D_{max}$]. The solution is dependent, among other things, on the desired granularity. Choosing a solution closer to $D_{min}$ would decrease the number of service functions SF that the service provider needs to maintain—but it might force the requesters to deal with a larger number of them, potentially increasing their costs (for example, if they are being charged based on the number of service functions needed to cover them).

Of course, one could consider more complex forms of optimization here—for example those that take into account costs of maintaining various service functions and costs of their activation. The number of possibilities is very large—but, in general they will tend to lead to a mathematical programming formulation of a type similar to Eq. A.9, may include a more general objective function and, possibly, different or additional constraints.

Disclosed are a method and a system which, for given business functions, data grouping rules, and constraints identifies a set of service-related elements that include service functions, services, and choreographed services that are responsive to a set of metrics.

These teachings include a method and apparatus for optimizing the tradeoff between coarse-grained and fine-grained services using a mathematical technique for optimizing the aggregate utility to all service consumers for a given investment by the service provider. The techniques disclosed are illustrated for cases of providing data access services. However, one skilled in the art will recognize that such embodiments are general, and that the teachings can be applied to any collection of requirements that can be quantified in a similar manner.

Stated another way, the teachings herein include data-oriented techniques for composing an optimally grained set of service data objects that with logic added can be implemented as service functions that can be assembled into one or more choreographed services. One embodiment of this invention can implement the technique as a plug-in for a modeling tool that will allow a designer to create a high level data organization that covers both the requesters and business functions they requested. The teachings also allow a designer to model data objects that could be realized as service functions. In other embodiments, a designer is able to model new data objects that could be realized as new service functions while preserving the existing data objects and corresponding service functions. Further, the teachings provide a development tool to simulate service functions. Some embodiments provide for analysis of the inventory of existing services (in case of acquisitions and mergers) with merged services by comparing the existing repositories of services with preliminary designed services using the tolerance data coefficient. In some other embodiments, excessive data can be optionally encrypted for privacy and security.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other embodiments.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage device through intervening private or public networks. Modems, cable modem and Ethernet cards are just a few of the currently available types o network adapters.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer program product comprising a tangible computer usable medium having a computer readable program for managing granularity of a computing service infrastructure, wherein the computer readable program when executed on a computer causes the computer to:

identify a group having a number of service requestors;

identify a set of business functions that may be requested by the group of service requestors by either customized or non-customized service requests;

create a value (n1) that represents the smallest number of customized service functions to realize all of the business functions;

create a value (n2) that represents the smallest total number of non-customized service functions to realize all of the business functions; and iteratively determine an optimal number L of customized and non-customized service functions to realize the business functions, where L is between n1 and n2 and increases from n2 towards n1 as a number of each requestor is assigned a customized service request for each business function.

2. The computer program product as in claim 1, wherein the at least one set of service functions comprises at least one of logic, data and combinations of logic and data.

3. The computer program product as in claim 1, wherein one of the constraints specifies at least one of complexity and cost for one of the service functions.

4. The computer program product as in claim 1, wherein the computer program product further causes the computer to:

characterize at least one rule and at least one constraint for determining an optimal number L wherein one of the constraints comprises a tolerance coefficient for output data of at least one of the service functions.

5. The computer program product as in claim 1, wherein the set of service functions comprise service functions having diverse granularity.

6. The computer program product as in claim 1, wherein the set of service functions comprise at least one of a business function and an output data object.

7. The computer program product as in claim 1, wherein the at least one set of metrics is responsive to a service requestor.

* * * * *